United States Patent [19]
Costa et al.

[11] Patent Number: 5,660,809
[45] Date of Patent: Aug. 26, 1997

[54] INORGANIC OXIDE-BASED MATERIALS WITH MONODISPERSED PARTICLE SIZE

[75] Inventors: Lorenzo Costa, Sommo Lomellina; Giulio Boara, Crema; Guido Cogliati, Rome, all of Italy

[73] Assignee: Istituto Guido Donegani S.p.A., Novara, Italy

[21] Appl. No.: 177,309

[22] Filed: Jan. 4, 1994

Related U.S. Application Data

[62] Division of Ser. No. 960,797, Oct. 14, 1992, Pat. No. 5,304,364.

[30] Foreign Application Priority Data

Oct. 17, 1991 [IT] Italy .................... MI9102743

[51] Int. Cl.$^6$ .................... C01B 33/16
[52] U.S. Cl. .................... 423/338
[58] Field of Search .................... 423/326, 335, 423/338, 579

[56] References Cited

U.S. PATENT DOCUMENTS

| | | | |
|---|---|---|---|
| 4,622,311 | 11/1986 | Wakui et al. | 502/235 |
| 4,847,235 | 7/1989 | van der Hiewn | 502/407 |
| 4,849,378 | 7/1989 | Henah et al. | 501/12 |
| 4,975,405 | 12/1990 | Okamura et al. | 502/233 |
| 5,094,829 | 3/1992 | Krivak et al. | 423/339 |
| 5,128,114 | 7/1992 | Schwartz | 423/335 |
| 5,158,758 | 10/1992 | Chieng et al. | 423/338 |
| 5,189,000 | 2/1993 | Masi et al. | 502/113 |
| 5,231,066 | 7/1993 | Rekers et al. | 502/239 |
| 5,270,027 | 12/1993 | Balducci et al. | 423/338 |
| 5,304,364 | 4/1994 | Costa et al. | 423/338 |

*Primary Examiner*—George Fourson
*Attorney, Agent, or Firm*—Oblon, Spivak, McClelland, Maier & Neustadt, P.C.

[57] ABSTRACT

A method for preparing inorganic oxide-based materials of spherical form with substantially monomodal distribution, consisting of forming a sol of at least one of the inorganic oxides of interest, adding to said sol a solvent immiscible with the sol, finely dispersing the obtained two-phase mixture into a dispersion of particles of equal diameter, growing said particles by limited coalescence to the desired diameter, gelling said mixture by adding a second solvent containing a gelling agent, and removing the solvent.

6 Claims, No Drawings

INORGANIC OXIDE-BASED MATERIALS WITH MONODISPERSED PARTICLE SIZE

RELATED APPLICATION

This application is a Division of U.S. application Ser. No. 07/960,797, filed Oct. 14, 1992, now U.S. Pat. No. 5,304,364.

BACKGROUND OF THE INVENTION

Field of the Invention

This invention relates to a method for preparing inorganic oxide-based materials of typically spherical form with controllable particle size, preferably monodispersed within a narrow diameter distribution band, the method consisting basically of forming a uniform finely divided dispersion of a sol of at least one of the oxides of interest in a solvent immiscible with the sol and chosen to allow limited coalescence in an emulsion in it, effecting growth by limited coalescence of the dispersed phase to a predetermined diameter by controlling for this purpose the time of growth of said dispersed phase, then causing gelling of the mixture thus obtained by adding a second solvent, and drying the resultant gel.

The method in question enables inorganic materials, typically oxides or oxide mixtures, to be rapidly and advantageously obtained, these forming a second aspect of the present invention and finding application in all those sectors in which high chemical and thermal stability, monodispersed particle size, spherical form and high porosity and surface area are essential requirements.

Of all possible uses, their application to the catalysis field is of particular importance, in which the materials of the present invention can be used as high-quality catalyst supports, especially in olefin polymerization processes using Ziegler-Natta or Phillips catalysts or in such processes conducted in the gaseous phase.

The materials of the invention can also be conveniently used in the insulation sector, in which a material of very low density, low cost and easily processable can certainly compete with foamed polyurethane. In this respect, a spherical monodispersed granular material is runnable and can be treated in many processes as a liquid.

Lastly, but of no less importance, the materials of the present invention can be applied in the ceramics field, in which precursor quality and particle size control are essential.

BACKGROUND OF THE INVENTION

The use of inorganic oxides, especially metal oxides, is well known in the state of the art in relation to a large number of applications. For example, they can be used as catalysts, catalyst supports, adsorption media, packing for chromatographic columns, pigments, opacifiers, abrasives etc.

Examples of their use as catalysts or catalyst supports are given in U.S. Pat. No. 3,673,111 (phosphoric acid preparation) and in an article in the Journal of Molecular Catalysis, vol. 17, 219–223 (1983) (catalyst support in olefin preparation).

Known powders, especially those for use as catalyst supports, normally consist of inorganic oxides obtained by precipitating hydroxides from aqueous solutions of the corresponding cations, followed by calcining. Powders in this manner generally have a very low specific surface and porosity, the spherical particles do not always posses suitable mechanical properties, and their particle size is dispersed within a wide range, which sometimes makes their use inadvisable precisely for the application for which they are intended. In this respect, it is not infrequent to find that catalyst systems obtained using such powders do not allow the reactions of interest to take place with good productivity, so making it necessary to use increasing catalyst concentrations, requiring the application of costly wash processes for the catalyst residues.

It is likewise known to prepare aerogels and in particular aerogel microbeads of one or more oxides, the microbeads being characterised by high porosity and the fact that most of the pores have a diameter within a very narrow band, and being usable as catalysts or catalyst supports (U.S. patent application Ser. No. 07/690,305). The preparation process for such microbeads requires however a drying stage under hypercritical conditions, which makes it not always suitable for convenient industrial application.

SUMMARY OF THE INVENTION

The applicant has now found that it is possible, rapidly and advantageously, including from an industrial viewpoint, to prepare inorganic oxide-based materials in spherical form, of high surface area and of particle size monodispersed within a narrow band of pore diameter distribution, by a method comprising essentially the following operations:

hydrolyzing one or more derivatives of the elements of interest until a sol forms;

dispersing the sol obtained in a solvent immiscible or poorly miscible with water;

microgrinding the dispersion obtained;

diluting the finely divided dispersion with a solvent different from that already present, until a gel forms;

removing the solvent from the gel thus formed.

DETAILED DESCRIPTION OF THE PREFERRED EMBODIMENTS

This method can be said to represent an application of limited coalescence emulsification, it being surprising that based on this technique the applicant is able to produce inorganic materials of monomodal particle size with controlled characteristics, and usable in sectors such as Ziegler-Natta catalysis, as it is well known that this technique is used exclusively for the synthesis of organic polymers or in the preparation of monodispersed spherical powders for industrial application in the field of dry inks for electrography (such as U.S. Pat. Nos. 4,833,060 and 4,835,084).

Specifically, the method of the present invention comprises the following fundamental steps:

a) preparing a colloidal solution (sol) of an oxide of a metal of interest by hydrolyzing an alkoxide or a mixture of alkoxides or a mixture of alkoxides and colloidal oxides such as that silica known commercially as fumed silica; one or more alkoxides can be replaced by the relative halides;

b) dispersing the colloidal solution in a medium immiscible with the sol; any solvent can be used for this purpose provided it is immiscible or only poorly miscible with water, such as alcohols with more than 4 carbon atoms, hydrocarbon halo-derivatives, carbonates such as ethylcarbonate, isoamyl carbonate etc., aromatic hydrocarbons and their halo-derivatives, cyclic ketones etc. Decanol, chlorobenzene, chloromethane, dichloromethane, carbon tetrachloride, toluene, xylene, cyclohexanone etc. are of particular interest, those of lowest volatility being preferred;

c) atomization or ultrafine uniform dispersion of the two phases and uniform growth by limited coalescence until monodispersed droplets of the desired diameter are obtained;

d) gelling the dispersion in a suitable solution of gelling agent by further dilution with a solvent chosen from those indicated under point b), and possibly but not necessarily different form that used for forming said colloidal dispersion; the gelling temperature is typically ambient temperature, but can also be higher or lower; the time for which the dispersion remains in the gelling solution is preferably between 2 and 10 minutes, but can be shorter or longer; the gelling operation can be conducted on the finely divided dispersion either as such, or the diluent used in this stage can be provided with a stabilizer able to prevent any particle agglomeration; again in this case the choice is dictated by the knowledge on which the expert of the art bases the implementation of the various stages, which are indeed well known as individual operations but which are absolutely new in terms of their combination in applying limited coalescence emulsification to the preparation of inorganic oxides or oxide mixtures according to the present invention;

e) possibly washing the suspension with suitable solvents to remove water and other undesirable products such as low-boiling alcohols;

f) removing the solvent from the gel by hypercritical drying, evaporation or solvent exchange to obtain a turbid product of determined specification.

If desired, the powder obtained can finally be calcined to remove any organic substances present or to give it particular characteristics, such as better mechanical properties.

The material obtained by the aforesaid method, which also forms an integral part of the invention, is hence in the form of a powder consisting of spherical granules, with a porosity controllable between 4 cc/g and 1 cc/g, a surface area controllable between 20 $m^2/g$ and 1000 $m^2/g$ (BET measured), and a pore diameter distribution controllable in the case both of polymodal and of monomodal distribution, said diameter being variable from a few nm to 1000 nm, but with the difference between the maximum and minimum diameter never exceeding 20% of the minimum diameter in the same powder.

To prepare the initial sol, alkoxides of metals pertaining to Groups II to VI, VIIB or VIII of the periodic table can be used. The use of Al, Si, Ti, B, La, Zr, Cr, Sn and Mg alkoxides is of particular interest.

As stated, powders of either a single oxide or of mixed oxides can be prepared, in this latter case the hydrolysis of point a) being performed on a mixture of alkoxides, of alkoxides and chlorides, of alkoxides and colloidal oxides, or a combination thereof.

The hydrolysis in effected in the presence of an inorganic acid, base or salt, in accordance for example with that stated in U.S. patent application Ser. No. 07/690,305, that part thereof relative to hydrolysis being incorporated herein by reference.

As repeatedly stated herein, the spherical materials obtained by the method of the present invention can form an excellent support for catalysts for the polymerization and copolymerization of olefinically unsaturated compounds. Such catalysts can then comprise an aluminum organometal compound and a second component obtained by bringing at least one magnesium compound, a titanium, vanadium or chromium compound, and possibly at least one compound of a second metal chosen from Al, V, Zn, Hf, Nd and Mo into contact with a support consisting of one of the spherical materials according to the present invention.

Again in this case, methods for the preparation of such catalysts are well known in the state of the art, and reference should be made thereto as necessary. In this respect, for example, a relevant document can be considered to be U.S. Pat. No. 5,189,000 relative to a supported catalyst for polymerization of olefinically unsaturated compounds, in which the support described in the indicated methods for preparing a variety of catalysts can be reliably replaced by the spherical material according to the present invention.

EXAMPLE 140 cc of 0.01N HCl is added under continuous moderate mechanical agitation to 100 cc of tetraethylorthosilane (TEOS), with the formation of two liquid phases.

Agitation is maintained until hydrolysis has taken place, this being apparent by final transparency of the reaction mixture, indicating that a single phase has finally formed.

30 cc of the sol obtained in this manner are added to an organic dispersant (solvent 1) consisting of 90 cc of decanol.

The mixture, which clearly separates into two phases, is fed via the appropriate glass funnel into a microfluidizer (MOD M110T) provided with a high pressure pump, and recirculated continuously for about 5 minutes, until a finely dispersed mixture of the two phases, of uniform appearance, is obtained.

The mixture leaving the microfluidizer is fed into the appropriate gelling vessel into which 30 cc of Primene ($R_3C=NH_2$, where $C_{16}<R<C_{22}$) dissolved in 100 cc of chlorobenzene (solvent 2) has been previously placed.

The critical parameter of controlling the diameter of the monodispersion is the time for which the dispersion is allowed to "grow" by limited coalescence, under conditions under which the coalescence rate is rigorously standardized.

The gelling time was fixed at 5 minutes, under agitation. The suspension was washed 4 times with ethanol fractions equal to 50% of its volume.

The product was then collected on a filter and dried under reduced pressure at ambient temperature.

The product was characterised by electronic and optical microscopes, showing spherical morphology with a mean diameter of around 30 nm and substantially monomodal distribution.

An equatorial cross-section through the spheres, suitably highlighted, shows a considerably uniform structure with the absence of defects or inclusions.

What is claimed is:

1. A spherical particulate inorganic oxide material having a surface area between 20–1000 $m^2/g$, a porosity between 1–4 cc/g and a pore diameter distribution such that the difference between the maximum pore diameter and the minimum pore diameter does not exceed 20% of the minimum pore diameter, wherein said maximum pore diameter and minimum pore diameter are between 1–1000 nm and wherein said spherical particulate material is monodispersed.

2. The material of claim 1, wherein said material is a metal oxide, wherein said metal is selected from the group consisting of metals of groups II–VI, VIIB and VIII of the Periodic Table of Elements.

3. The material of claim 2, wherein said metal is selected from the group consisting of Al, Si, Ti, B, La, Zr, Cr, Sn and Mg.

4. The material of claim 3, wherein said material is silicon dioxide.

5. A spherical particulate inorganic oxide material having a surface area between 20–1000 $m^2/g$, a porosity between 1–4 cc/g and a pore diameter distribution such that the difference between the maximum pore diameter and the minimum pore diameter does not exceed 20% of the minimum pore diameter, wherein said maximum pore diameter and minimum pore diameter are between 1–1000 nm, prepared by a process consisting essentially of the steps:

(1) forming a sol of at least one inorganic oxide of a metal selected from Groups II–VI, VIIB or VIII of the Periodic Table of Elements, (2) adding to said sol a first solvent immiscible with said sol to obtain a two-phase mixture, (3) finely dispersing said two-phase mixture into a dispersion of particles wherein the difference between the maximum and minimum diameters of said particles does not exceed 20% of the minimum diameter of said particles, (4) increasing the size of said particles in said fine distribution by coalescing said fine particles to obtain a dispersion of coalesced particles, (5) gelling said dispersion of coalesced particles by adding a second solvent, which is the same or different than said first solvent, containing a jelling agent to said dispersion of coalesced particles, and (6) removing said first and second solvents to obtain said inorganic oxide material having monodispersed spherical particles.

6. The material of claim 5, wherein said process further comprises (7) washing said gelled dispersion with a solvent capable of removing water and low-boiling alcohols.

* * * * *

UNITED STATES PATENT AND TRADEMARK OFFICE
CERTIFICATE OF CORRECTION

PATENT NO. : 5,660,809
DATED : August 26, 1997
INVENTOR(S) : Lorenzo COSTA et al.

It is certified that error appears in the above-indentified patent and that said Letters Patent is hereby corrected as shown below:

On the title page, Item [30], The Foreign Application Number should read:

-- MI91A002743 --

Signed and Sealed this

Second Day of December, 1997

Attest:

Attesting Officer

BRUCE LEHMAN

Commissioner of Patents and Trademarks